US012312658B2

(12) United States Patent
Rame et al.

(10) Patent No.: US 12,312,658 B2
(45) Date of Patent: May 27, 2025

(54) NICKEL-BASED SUPERALLOY HAVING HIGH MECHANICAL STRENGTH AT A HIGH TEMPERATURE

(71) Applicants: SAFRAN, Paris (FR); UNIVERSITE DE NANTES, Nantes (FR); CENTRE NATIONAL DE LA RECHERCHE SCIENTIFIQUE, Paris (FR)

(72) Inventors: Jérémy Rame, Moissy-Cramayel (FR); Edern Menou, Moissy-Cramayel (FR); Clara Desgranges, Moissy-Cramayel (FR); Franck Tancret, Nantes (FR)

(73) Assignees: SAFRAN, Paris (FR); UNIVERSITE DE NANTES, Nantes (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 566 days.

(21) Appl. No.: 17/422,044

(22) PCT Filed: Jan. 14, 2020

(86) PCT No.: PCT/FR2020/050049
§ 371 (c)(1),
(2) Date: Jul. 9, 2021

(87) PCT Pub. No.: WO2020/148504
PCT Pub. Date: Jul. 23, 2020

(65) Prior Publication Data

US 2022/0098705 A1 Mar. 31, 2022

(30) Foreign Application Priority Data

Jan. 16, 2019 (FR) ....................................... 1900390

(51) Int. Cl.
*C22C 19/05* (2006.01)
*C23C 28/00* (2006.01)
*F01D 5/28* (2006.01)

(52) U.S. Cl.
CPC .......... *C22C 19/057* (2013.01); *C23C 28/321* (2013.01); *C23C 28/3455* (2013.01); *F01D 5/288* (2013.01); *C22C 2204/00* (2013.01); *F05B 2280/10741* (2013.01)

(58) Field of Classification Search
CPC ................................. C22C 19/057; C22F 1/10
See application file for complete search history.

(56) References Cited

U.S. PATENT DOCUMENTS

| | | | | | |
|---|---|---|---|---|---|
| 4,119,458 | A | | 10/1978 | Moore | |
| 4,801,513 | A | | 1/1989 | Duhl et al. | |
| 6,015,630 | A | * | 1/2000 | Padture | C23C 28/00 416/241 B |
| 2003/0041930 | A1 | * | 3/2003 | DeLuca | C22C 19/056 420/443 |
| 2008/0170961 | A1 | * | 7/2008 | Seetharaman | F01D 5/28 420/445 |

FOREIGN PATENT DOCUMENTS

| | | | | | |
|---|---|---|---|---|---|
| EP | 0 971 041 | A1 | | 1/2000 | |
| EP | 1 319 729 | A1 | | 6/2003 | |
| EP | 2 128 284 | A1 | | 12/2009 | |
| EP | 2 333 121 | A1 | | 6/2011 | |
| EP | 2 942 411 | A1 | | 11/2015 | |
| FR | 2 854 165 | A1 | | 10/2004 | |
| IN | 201917018376 | A | | 5/2019 | |
| IN | 202017019996 | A | | 5/2020 | |
| IN | 202017020003 | A | | 5/2020 | |
| WO | WO 01/64964 | A1 | | 9/2001 | |
| WO | WO-2008032751 | A1 | * | 3/2008 | C22C 19/00 |
| WO | WO 2018/078269 | A1 | | 5/2018 | |

OTHER PUBLICATIONS

English Abstract and English Machine Translation of Akihiro et al. (WO 2008/032751 A1) (Mar. 20, 2008).*
HR First Office Action as issued in Chinese Patent Application No. 202080009476.5, dated Feb. 15, 2022.
International Search Report as issued in International Patent Application No. PCT/FR2020/050049, dated Apr. 15, 2020.

* cited by examiner

*Primary Examiner* — Jessee R Roe
(74) *Attorney, Agent, or Firm* — Pillsbury Winthrop Shaw Pittman LLP

(57) ABSTRACT

A nickel-based superalloy includes, in weight percent, 4 to 6% aluminum, 5 to 8% cobalt, 6 to 9% chromium, 0.1 to 0.9% hafnium, 2 to 4% molybdenum, 5 to 7% rhenium, 5 to 7% tantalum, 2 to 5% tungsten, 0 to 0.1% silicon, the balance being of nickel and unavoidable impurities.

16 Claims, No Drawings

NICKEL-BASED SUPERALLOY HAVING HIGH MECHANICAL STRENGTH AT A HIGH TEMPERATURE

CROSS-REFERENCE TO RELATED APPLICATIONS

This application is the U.S. National Stage of PCT/FR2020/050049, filed Jan. 14, 2020, which in turn claims priority to French patent application number 1900390 filed Jan. 16, 2019. The content of these applications are incorporated herein by reference in their entireties.

TECHNICAL FIELD

The present invention relates to the general field of nickel-based superalloys for turbomachinery, in particular for vanes, also called distributors or rectifiers, or blades, or ring segments.

PRIOR ART

Nickel-based superalloys are generally used for the hot parts of turbomachinery, i.e., the parts of turbomachinery downstream of the combustion chamber.

The main advantages of nickel-based superalloys are that they combine both high creep resistance at temperatures comprised between 650° C. and 1200° C. and resistance to oxidation and corrosion.

The high-temperature performance is mainly due to the microstructure of these materials, which is composed of a γ-Ni matrix of face-centered cubic (FCC) crystal structure and ordered $\gamma'$-$Ni_3Al$ hardening precipitates of $L1_2$ structure.

In order to improve the resistance of the superalloy part to a corrosive and/or oxidizing environment, such as combustion gases, a protective coating can be deposited on the part.

The protective coating can also act as a thermal insulator to reduce the temperature seen by the superalloy substrate on which the protective coating is deposited.

The protective coating is generally composed of a first layer, and a second layer deposited on the first layer.

The first layer, usually called the bonding layer or sublayer, is deposited on the superalloy. The first layer is commonly composed of an aluminum-forming alloy.

The second layer, usually called the thermal barrier, is a porous ceramic coating.

However, at high temperatures, a significant interdiffusion phenomenon at the microscopic scale takes place between the first layer and the superalloy, thus modifying their respective chemical compositions. The chemical modification of the superalloy and the first layer modifies their properties, thus influencing the adhesion of the protective coating.

Furthermore, during the manufacture of the superalloy part, parasitic grains of the "freckle" type can form. These parasitic grains are likely to cause premature failure of the part.

DISCLOSURE OF THE INVENTION

The aim of the present invention is to provide nickel-based superalloy compositions that improve adhesion between the superalloy and the protective coating.

Another aim of the present invention is to provide nickel-based superalloy compositions that improve mechanical properties, and in particular creep resistance.

Another aim of the present invention is to provide superalloy compositions that possess good environmental resistance, and in particular corrosion resistance and oxidation resistance.

It is also an aim of the present to provide superalloy compositions that have a reduced density.

According to a first aspect, the invention provides a nickel-based superalloy comprising, in weight percent, 4 to 6% aluminum, 5 to 8% cobalt, 6 to 9% chromium, 0.1 to 0.9% hafnium, 2 to 4% molybdenum, 5 to 7% rhenium, 5 to 7% tantalum, 2 to 5% tungsten, 0 to 0.1% silicon, the balance consisting of nickel and unavoidable impurities.

A nickel-based alloy is defined as an alloy with a majority of nickel by weight.

Unavoidable impurities are defined as elements not intentionally added to the composition but contributed with other elements. Among unavoidable impurities, particular mention may be made of carbon (C) or sulfur (S).

The nickel-based superalloy in accordance with the invention has good microstructural stability at temperature, thus enabling high mechanical properties to be obtained at temperature.

The nickel-based superalloy in accordance with the invention improves the resistance of a protective coating on said superalloy due to the absence of titanium (Ti).

The nickel-based superalloy in accordance with the invention has high corrosion and oxidation resistance.

The nickel-based superalloy in accordance with the invention reduces the susceptibility to casting defect formation.

The nickel-based superalloy in accordance with the invention provides a density of less than 8.9 $g \cdot cm^{-3}$.

According to a possible alternative, the superalloy may comprise, in weight percent, 4.5 to 5.5% aluminum, 5 to 8% cobalt, 6.5 to 8.5% chromium, 0.1 to 0.6% hafnium, 2.5 to 3.5% molybdenum, 5.5 to 6.5% rhenium, 5.5 to 6.5% tantalum, 2.5 to 4.5% tungsten, 0 to 0.1% silicon, the balance consisting of nickel and unavoidable impurities.

Furthermore, the superalloy may comprise, in weight percent, 4.5 to 5.5% aluminum, 5 to 8% cobalt, 6.5 to 8.5% chromium, 0.1 to 0.6% hafnium, 2.5 to 3.5% molybdenum, 5.5 to 6.5% rhenium, 5.5 to 6.5% tantalum, 2.5 to 4.5% tungsten, the balance consisting of nickel and unavoidable impurities.

In this alternative, silicon is an unavoidable impurity.

The superalloy may also comprise, in weight percent, 4.5 to 5.5% aluminum, 5 to 8% cobalt, 6.5 to 8.5% chromium, 0.2 to 0.5% hafnium, 2.5 to 3.5% molybdenum, 5.5 to 6.5% rhenium, 5.5 to 6.5% tantalum, 2.5 to 4.5% tungsten, the balance consisting of nickel and unavoidable impurities.

According to a possible alternative, the superalloy may comprise, in weight percent, 4.5 to 5.5% aluminum, 6 to 8% cobalt, 6.5 to 7.5% chromium, 0.1 to 0.6% hafnium, and preferably 0.2 to 0.5%, 2.5 to 3.5% molybdenum, 5.5 to 6.5% rhenium, 5.5 to 6.5% tantalum, 3.5 to 4.5% tungsten, the balance consisting of nickel and unavoidable impurities.

According to a possible alternative, the superalloy may also comprise, in weight percent, 4.5 to 5.5% aluminum, 6 to 8% cobalt, 6.5 to 7.5% chromium, 0.1 to 0.6% hafnium and preferably 0.2 to 0.5%, 2.5 to 3.5% molybdenum, 5.5 to 6.5% rhenium, 5.5 to 6.5% tantalum, 2.5 to 3.5% tungsten, the balance consisting of nickel and unavoidable impurities.

The superalloy may further comprise, in weight percent, 4.5 to 5.5% aluminum, 5 to 7% cobalt, 6.5 to 7.5% chromium, 0.1 to 0.6% hafnium, and preferably 0.2 to 0.5%, 2.5 to 3.5% molybdenum, 5.5 to 6.5% rhenium, 5.5 to 6.5% tantalum, 2.5 to 3.5% tungsten, the balance consisting of nickel and unavoidable impurities.

According to a possible alternative, the superalloy may comprise, in weight percent, 4.5 to 5.5% aluminum, 6 to 8% cobalt, 7.5 to 8.5% chromium, 0.1 to 0.6% hafnium, and preferably 0.2 to 0.5%, 2.5 to 3.5% molybdenum, 5.5 to 6.5% rhenium, 5.5 to 6.5% tantalum, 2.5 to 3.5% tungsten, the balance consisting of nickel and unavoidable impurities.

According to a second aspect, the invention provides a nickel-based superalloy turbomachinery part according to any of the preceding features.

The part can be an element of an aircraft turbomachinery turbine, for example a high-pressure turbine or a low-pressure turbine, or a compressor element, and in particular a high-pressure compressor.

According to an additional feature, the turbine or compressor part can be a blade, said blade can be a moving blade or a vane, or a ring sector.

According to another feature, the turbomachinery part comprises a thermal protective coating formed by a bonding layer deposited on the nickel-based superalloy, and a thermal barrier layer deposited on the bonding layer.

According to another feature, the turbomachinery part is single-crystal, preferably with a crystal structure oriented along a crystallographic direction <001>.

According to a third aspect, the invention provides a process for manufacturing a nickel-based superalloy turbomachinery part according to any one of the preceding features by casting.

According to an additional feature, the process comprises depositing a thermal protective coating on the nickel-based superalloy part according to the following steps:

depositing a bonding layer on the part;

depositing a thermal barrier layer on the bonding layer.

DESCRIPTION OF THE EMBODIMENTS

The superalloy in accordance with the invention comprises a nickel base with associated major additive elements.

Major additive elements comprise: cobalt Co, chromium Cr, molybdenum Mo, tungsten W, aluminum Al, tantalum Ta, titanium Ti, and rhenium Re.

The superalloy may also comprise minor additive elements, which are additive elements whose maximum percentage in the superalloy does not exceed 1% by weight.

Minor additive elements comprise: hafnium Hf and silicon Si.

The nickel-based superalloy comprises, in weight percent, 4 to 6% aluminum, 5 to 8% cobalt, 6 to 9% chromium, 0.1 to 0.9% hafnium, 2 to 4% molybdenum, 5 to 7% rhenium, 5 to 7% tantalum, 2 to 5% tungsten, 0 to 0.1% silicon, the balance consisting of nickel and unavoidable impurities.

The nickel-based superalloy may also advantageously comprise, in weight percent, 4 to 6% aluminum, 5 to 8% cobalt, 6 to 9% chromium, 0.1 to 0.9% hafnium, 2 to 4% molybdenum, 5 to 7% rhenium, 5 to 7% tantalum, 2 to 5% tungsten, the balance consisting of nickel and unavoidable impurities. In this alternative silicon is an unavoidable impurity.

The nickel-based superalloy may also advantageously comprise, in weight percent, 4.5 to 5.5% aluminum, 5 to 8% cobalt, 6.5 to 8.5% chromium, 0.1 to 0.6% hafnium 2.5 to 3.5% molybdenum, 5.5 to 6.5% rhenium, 5.5 to 6.5% tantalum, 2.5 to 4.5% tungsten, 0 to 0.1% silicon, the balance consisting of nickel and unavoidable impurities.

The nickel-based superalloy may also advantageously comprise, in weight percent, 4.5 to 5.5% aluminum, 5 to 8% cobalt, 6.5 to 8.5% chromium, 0.1 to 0.6% hafnium, 2.5 to 3.5% molybdenum, 5.5 to 6.5% rhenium, 5.5 to 6.5% tantalum, 2.5 to 4.5% tungsten, the balance consisting of nickel and unavoidable impurities. In this alternative silicon is an unavoidable impurity.

The nickel-based superalloy may also advantageously comprise, in weight percent, 4.5 to 5.5% aluminum, 5 to 8% cobalt, 6.5 to 8.5% chromium, 0.2 to 0.5% hafnium, 2.5 to 3.5% molybdenum, 5.5 to 6.5% rhenium, 5.5 to 6.5% tantalum, 2.5 to 4.5% tungsten, the balance consisting of nickel and unavoidable impurities.

The superalloy may also advantageously comprise, in weight percent, 4.5 to 5.5% aluminum, 6 to 8% cobalt, 6.5 to 7.5% chromium, 0.1 to 0.6% hafnium (and preferably 0.2 to 0.5%), 2.5 to 3.5% molybdenum, 5.5 to 6.5% rhenium, 5.5 to 6.5% tantalum, 3.5 to 4.5% tungsten, the balance consisting of nickel and unavoidable impurities.

The superalloy may advantageously comprise, in weight percent, 4.5 to 5.5% aluminum, 6 to 8% cobalt, 6.5 to 7.5% chromium, 0.1 to 0.6% hafnium (and preferably 0.2 to 0.5%), 2.5 to 3.5% molybdenum, 5.5 to 6.5% rhenium, 5.5 to 6.5% tantalum, 2.5 to 3.5% tungsten, the balance consisting of nickel and unavoidable impurities.

The superalloy may also advantageously comprise, in weight percent, 4.5 to 5.5% aluminum, 5 to 7% cobalt, 6.5 to 7.5% chromium, 0.1 to 0.6% hafnium (and preferably 0.2 to 0.5%), 2.5 to 3.5% molybdenum, 5.5 to 6.5% rhenium, 5.5 to 6.5% tantalum, 2.5 to 3.5% tungsten, the balance consisting of nickel and unavoidable impurities.

Preferentially, the superalloy may comprise, in weight percent, 4.5 to 5.5% aluminum, 6 to 8% cobalt, 7.5 to 8.5% chromium, 0.1 to 0.6% hafnium (and preferably 0.2 to 0.5%), 2.5 to 3.5% molybdenum, 5.5 to 6.5% rhenium, 5.5 to 6.5% tantalum, 2.5 to 3.5% tungsten, the balance consisting of nickel and unavoidable impurities.

Cobalt, chromium, tungsten, molybdenum and rhenium are mainly involved in the hardening of the $\gamma$ phase, the austenitic matrix of FCC structure.

Aluminum and tantalum promote the precipitation of the $\gamma'$ phase, the hardening $Ni_3$ (Al, Ti, Ta) phase of ordered cubic structure $L1_2$.

Furthermore, rhenium slows down the diffusive processes and limits the coalescence of the $\gamma'$ phase, thus improving the creep resistance at high temperature. However, the rhenium content should not be too high in order not to negatively impact the other mechanical properties of the superalloy part.

The refractory elements, namely molybdenum, tungsten, rhenium and tantalum, also slow down the diffusion-controlled mechanisms, thus improving the creep resistance of the superalloy part.

Furthermore, chromium and aluminum improve resistance to oxidation and corrosion at high temperatures, in particular around 900° C. for corrosion and around 1100° C. for oxidation.

Hafnium also optimizes the hot oxidation resistance of the superalloy by increasing the adhesion of the $Al_2O_3$ alumina layer that forms on the surface of the superalloy at high temperature in an oxidizing environment.

Silicon can also optimize the hot oxidation resistance of the superalloy.

Furthermore, chromium and cobalt help to decrease the γ' solvus temperature of the superalloy.

Cobalt is an element chemically related to nickel that partially substitutes for nickel to form a solid solution in the γ phase, thereby strengthening the γ matrix, reducing the susceptibility to precipitation of topologically compact phases, including μ, P, R, and σ phases, and Laves, and reducing the susceptibility to secondary reaction zone (SRZ) formation.

In addition, the fact that the superalloy does not comprise titanium is beneficial to the strength and life of a thermal protective coating deposited on the superalloy.

Such a superalloy composition improves the mechanical properties at high temperature (650° C.-1200° C.) of the parts manufactured from said superalloy.

In particular, such a superalloy composition makes it possible to obtain a minimum fracture stress of 290 MPa at 950° C. for 1100 h, as well as a minimum fracture stress of 150 MPa at 1050° C. for 550 h, and a minimum fracture stress of 55 MPa at 1200° C. for 510 h.

Such mechanical properties are due in particular to a microstructure comprising a γ phase and a γ' phase, and a maximum content of topologically compact phases of 6%, in mole percent. The topologically compact phases comprise the μ, P, R, and σ phases, as well as Laves. The microstructure may also comprise the following carbides: MC, $M_6C$, $M_7C_3$, and $M_{23}C_6$.

Furthermore, these mechanical properties of creep resistance at temperature are obtained thanks to a better stability of the microstructure between 650° C. and 1200° C.

Such a superalloy composition also provides high oxidation and corrosion resistance of parts made from said superalloy. The corrosion and oxidation resistance is achieved by ensuring a minimum of 9.5%, in atomic percent, of aluminum in the γ phase at 1200° C., and a minimum of 7.5%, in atomic percent, of chromium in the γ phase at 1200° C., thereby ensuring the formation of a protective layer of alumina on the surface of the material.

In addition, such a superalloy composition allows for improved manufacturing by reducing the risk of defect formation during the manufacture of the part, and in particular the formation of "freckle"-type parasitic grains during directional solidification.

Indeed, the superalloy composition reduces the susceptibility of the part to the formation of "freckle" parasitic grains. The susceptibility of the part to the formation of "freckle" parasitic grains is evaluated using the criterion of Konter, denoted NFP, which is given by the following equation (1):

[Math. 1]

$$NFP = \frac{[\%\ Ta + 1.5\%\ Hf + 0.5\%\ Mo - 0.5\%\ Ti]}{[\%\ W + 1.2\%\ Re]} \quad (1)$$

where % Ta is the tantalum content of the superalloy, in weight percent; where % Hf is the hafnium content of the superalloy, in weight percent; where % Mo is the molybdenum content of the superalloy, in weight percent; wherein % Ti is the titanium content of the superalloy, in weight percent; wherein % W is the tungsten content of the superalloy, in weight percent; and wherein % Re is the rhenium content of the superalloy, in weight percent.

The superalloy composition makes it possible to obtain an NFP parameter greater than or equal to 0.7, a value above which the formation of "freckle" parasitic grains is greatly reduced.

Furthermore, such a superalloy composition allows for a reduced density, in particular a density below 8.9 g/cm$^3$.

Table 1 below shows the composition, in weight percent, of four examples of superalloys in accordance with the invention, Examples 1 to 4, as well as commercial or reference superalloys, Examples 5 to 9. Example 5 corresponds to the Reneé®N5 superalloy, Example 6 corresponds to the CMSX-4® superalloy, Example 7 corresponds to the CMSX-4 Plus® Mod C superalloy, Example 8 corresponds to the Reneé®N6 superalloy, and Example 9 corresponds to the CMSX-10 K® superalloy.

TABLE 1

| Alloys | Ni | Al | Ta | Ti | Co | Cr | Mo | W | Re | Hf | Other |
|---|---|---|---|---|---|---|---|---|---|---|---|
| Ex 1 | Balance | 5 | 6 | 0 | 7 | 7 | 3 | 4 | 6 | 0.5 | |
| Ex 2 | Balance | 5 | 6 | 0 | 7 | 7 | 3 | 3 | 6 | 0.5 | |
| Ex 3 | Balance | 5 | 6 | 0 | 6 | 7 | 3 | 3 | 6 | 0.5 | |
| Ex 4 | Balance | 5 | 6 | 0 | 7 | 8 | 3 | 3 | 6 | 0.5 | |
| Ex 5 | Balance | 6.2 | 6 | 0 | 8 | 7 | 2 | 5 | 3 | 0.15 | 0.05 C + 0.004 B + 0.01 Y |
| Ex 6 | Balance | 5.6 | 6.5 | 1 | 9 | 6.5 | 0.6 | 6 | 3 | 0.1 | |
| Ex 7 | Balance | 5.7 | 8 | 0.85 | 10 | 3.5 | 0.6 | 6 | 4.8 | 0.1 | |
| Ex 8 | Balance | 6 | 7.5 | 0 | 12.2 | 4.4 | 1.1 | 5.7 | 5.3 | 0.15 | 0.05 C + 0.004 B + 0.01 Y |
| Ex 9 | Balance | 5.7 | 5 | 0.2 | 3 | 2 | 0.4 | 5 | 6 | 0.03 | 0.1 Nb + 0.015 i |

Furthermore, such a superalloy composition allows for a simplification of the part manufacturing process. Such simplification is ensured by obtaining a difference of at least 10° K between the solvus temperature of the γ' precipitates and the solidus temperature of the superalloy, thus facilitating the implementation of a step of re-solution of the γ' precipitates during the manufacturing of the part.

Table 2 gives estimated characteristics of the superalloys listed in Table 1. The characteristics given in Table 2 are density, Konter's criterion (NFP), as well as fracture stress at 950° C. for 1100 h, fracture stress at 1050° C. for 550 h, and fracture stress at 1200° C. for 510 h, the fracture stresses are named CRF in Table 2, for creep criterion.

TABLE 2

| Alloys | Density | NFP | CRF 950° C./1100 h (MPa) | CRF 1050° C./550 h (MPa) | CRF 1200° C./510 h (MPa) |
|---|---|---|---|---|---|
| Ex 1 | 8.88 | 0.74 | 303 | 183 | 80 |
| Ex 2 | 8.83 | 0.81 | 299 | 182 | 80 |
| Ex 3 | 8.82 | 0.81 | 300 | 182 | 79 |
| Ex 4 | 8.81 | 0.81 | 306 | 186 | 81 |
| Ex 5 | 8.58 | 0.85 | 222 | 136 | 73 |
| Ex 6 | 8.67 | 0.67 | 237 | 142 | 67 |
| Ex 7 | 8.90 | 0.68 | 265 | 150 | 56 |
| Ex 8 | 8.87 | 0.69 | 278 | 158 | 66 |
| Ex 9 | 8.98 | 0.67 | 285 | 160 | 58 |

As illustrated in Table 2, the superalloys in accordance with the invention allow the density to be maintained below 8.9 g·cm$^{-3}$, thus making the superalloys in accordance with the invention compatible with rotating applications, such as for example turbine blades.

Furthermore, the microstructure of the superalloys in accordance with the invention improves the high-temperature mechanical properties of said superalloys in accordance with the invention. Such a microstructure is obtained by promoting γ matrix hardening at high temperature rather than promoting γ' precipitation hardening, the promotion of γ matrix hardening being obtained by enrichment with hardening elements such as rhenium, tungsten, molybdenum, chromium and cobalt.

As can be seen in Table 2, the alloys in accordance with the invention have a fracture stress at 950° C. for 1100 h greater than 290 MPa, or even greater than or equal to 300 MPa for Examples 1, 3 and 4, while at most the alloy according to Example 9 has a fracture stress at 950° C. for 1100 h of 285 MPa. Furthermore, the alloys in accordance with the invention exhibit a fracture stress at 1050° C. for 550 h of more than 180 MPa, while at most the alloy according to Example 9 exhibits a fracture stress at 1050° C. for 550 h of 160 MPa. In addition, the alloys in accordance with the invention have a fracture stress at 1200° C. for 510 h greater than 75 MPa, or even greater than or equal to 80 MPa for Examples 1, 2 and 4, while at most the alloy according to Example 5 has a fracture stress at 1200° C. for 510 h of 73 MPa. Thus, at 1200° C., the alloys in accordance with the invention have a stress at break globally 10% to 30% higher than the stress at break of the alloys of Examples 5 to 9.

Table 3 gives estimated characteristics of the superalloys listed in Table 1. The characteristics given in Table 3 are the different transformation temperatures (the solvus, the solidus and the liquidus), the mole fraction of the γ' phase at 900° C., at 1050° C. and at 1200° C., the mole fraction of the topologically compacted phases (TPC) at 900° C. and at 1050° C.

TABLE 3

| | Transformation temperatures (° C.) | | | γ' phase volume fraction (% mol) | | | TCP volume fraction (% mol) | |
|---|---|---|---|---|---|---|---|---|
| Alloys | Solvus | Solidus | Liquidus | 900° C. | 1050° C. | 1200° C. | 900° C. | 1050° C. |
| Ex 1 | 1292 | 1300 | 1400 | 54 | 41 | 18 | 2.4 | 0 |
| Ex 2 | 1287 | 1304 | 1400 | 53 | 39 | 17 | 1.8 | 0 |
| Ex 3 | 1296 | 1307 | 1400 | 54 | 40 | 19 | 1.8 | 0 |
| Ex 4 | 1286 | 1297 | 1399 | 52 | 39 | 17 | 2.7 | 0 |
| Ex 5 | 1305 | 1335 | 1392 | 47 | 47 | 29 | 0 | 0 |
| Ex 6 | 1269 | 1311 | 1385 | 45 | 45 | 23 | 0 | 0 |
| Ex 7 | 1307 | 1320 | 1398 | 53 | 52 | 34 | 0.4 | 0.5 |
| Ex 8 | 1284 | 1336 | 1400 | 44 | 44 | 24 | 0.03 | 0.03 |
| Ex 9 | 1371 | 1382 | 1400 | 58 | 58 | 46 | 0.01 | 0.13 |

As shown in Table 3, the mole fraction of topologically compact phases, which are embrittling phases, for the superalloys of Examples 1 to 4 is low at 900° C. (<3%) and zero at 1050° C., also reflecting a high stability of the microstructure, which is beneficial for the mechanical properties at high temperature.

Table 4 gives estimated characteristics of the superalloys listed in Table 1. The characteristics given in Table 4 are the activity of chromium in they phase at 900° C., and the activity of aluminum in the γ phase at 1100° C. The activities of chromium and aluminum in the γ matrix are an indication of the corrosion and oxidation resistance, the higher the chromium activity and aluminum activity in the matrix, the higher the corrosion and oxidation resistance.

TABLE 4

| | γ phase Cr activity | γ phase Al activity |
|---|---|---|
| Alloys | 900° C. | 1100° C. |
| Ex 1 | 2.26E−3 | 9.22E−08 |
| Ex 2 | 2.12E−3 | 8.43E−08 |
| Ex 3 | 2.12E−3 | 7.90E−08 |
| Ex 4 | 2.57E−3 | 9.66E−08 |
| Ex 5 | 3.10E−3 | 1.29E−07 |
| Ex 6 | 3.02E−3 | 1.27E−07 |
| Ex 7 | 1.50E−3 | 1.02E−07 |

TABLE 4-continued

| | γ phase Cr activity | γ phase Al activity |
|---|---|---|
| Ex 8 | 1.79E−3 | 1.47E−07 |
| Ex 9 | 5.21E−4 | 4.23E−08 |

As can be seen in Table 4, the superalloys in accordance with the invention have a chromium activity at 900° C. of the same order of magnitude as the superalloys of Examples 5 and 6 which are superalloys known to have high corrosion resistance. Moreover, the superalloys in accordance with the invention have a higher aluminum activity at 1100° C. than the superalloy according to Example 9, thus ensuring satisfactory resistance to oxidation.

The properties given in the tables are estimated using the CALPHAD (CALculation of PHAse Diagrams) method.

The nickel-based superalloy part can be made by casting.

The casting of the part is made by melting the superalloy, the liquid superalloy being poured into a mold to be cooled and solidified. The casting of the part can for example be made by the lost wax technique, in particular to make a blade.

In addition, the process of manufacturing the part may comprise a step of depositing a thermal protective coating on the nickel-based superalloy part. The deposition of the thermal protective coating is performed in the following steps:

depositing a bonding layer on the superalloy part;

depositing a thermal barrier layer on the bonding layer.

The bonding layer is composed of an aluminum-forming material, such as an alloy of the MCrAlY type (with M=Ni and/or Co), or a platinum-modified nickel aluminide. The bonding layer has the function of forming an alumina layer that provides protection against oxidation of the underlying superalloy.

The bonding layer can have a thickness comprised between 50 μm and 100 μm.

The bonding layer can be obtained by depositing a layer of platinum on the superalloy, for example by electrodeposition or chemical vapor deposition, followed by alum inization at a temperature above 1000° C. in order to deposit aluminum on the platinum layer and to ensure a supply of nickel from the superalloy into the bonding layer by diffusion.

The bonding layer can also be formed by depositing a plurality of elemental layers of platinum, nickel and aluminum, for example by physical vapor deposition, with subsequent heat treatment to ensure reaction between the metals in the deposited layers.

The thermal barrier layer can be a ceramic, such as yttriated zirconia, which has the advantage of very low thermal conductivity and a high coefficient of expansion.

The thermal barrier layer can be deposited by plasma spraying or by physical vapor deposition.

The bonding layer can have a thickness comprised between 100 μm and 200 μm.

The thermal protective coating limits the temperature to which the superalloy is exposed and, on the other hand, protects the superalloy from oxygen in the environment in which the part is located. Thus, the protective coating is advantageous for turbine blades which are parts exposed to combustion gases.

Furthermore, in order to produce a single-crystal part, in particular a blade, the process can comprise a directional solidification step. The directional solidification is performed by controlling the thermal gradient and the solidification rate of the superalloy, and by introducing a single-crystal grain, in order to avoid the appearance of new grains in front of the solidification front.

In particular, directional solidification can enable the manufacture of a single-crystal part with a crystalline structure oriented along a crystallographic direction <001>, such an orientation providing better mechanical properties.

The invention claimed is:

1. A nickel-based superalloy consisting of, in weight percent, 4 to 6% aluminum, 5 to 8% cobalt, 6 to 9% chromium, 0.1 to 0.9% hafnium, 2.5 to 4% molybdenum, 5 to 7% rhenium, 5 to 7% tantalum, 2 to 5% tungsten, 0 to 0.1% silicon, the balance consisting of nickel and unavoidable impurities, wherein a ratio NFP defined by equation (1) is greater than or equal to 0.74:

$$NFP = \frac{[\%\ Ta + 1{,}5\%\ Hf + 0{,}5\%\ Mo - 0{,}5\%\ Ti]}{[\%\ W + 1{,}2\%\ \mathrm{Re}]}. \quad (1)$$

2. The superalloy as claimed in claim 1, wherein said superalloy consists of, in weight percent, 4.5 to 5.5% aluminum, 5 to 8% cobalt, 6.5 to 8.5% chromium, 0.1 to 0.6% hafnium 2.5 to 3.5% molybdenum, 5.5 to 6.5% rhenium, 5.5 to 6.5% tantalum, 2.5 to 4.5% tungsten, 0 to 0.1% silicon, the balance consisting of nickel and unavoidable impurities.

3. The superalloy as claimed in claim 2, wherein said superalloy consists of, in weight percent, 4.5 to 5.5% aluminum, 5 to 8% cobalt, 6.5 to 8.5% chromium, 0.1 to 0.6% hafnium, 2.5 to 3.5% molybdenum, 5.5 to 6.5% rhenium, 5.5 to 6.5% tantalum, 2.5 to 4.5% tungsten, the balance consisting of nickel and unavoidable impurities.

4. The superalloy as claimed in claim 3, wherein said superalloy consists of, in weight percent, 4.5 to 5.5% aluminum, 5 to 8% cobalt, 6.5 to 8.5% chromium, 0.2 to 0.5% hafnium, 2.5 to 3.5% molybdenum, 5.5 to 6.5% rhenium, 5.5 to 6.5% tantalum, 2.5 to 4.5% tungsten, the balance consisting of nickel and unavoidable impurities.

5. The superalloy as claimed in claim 3, wherein said superalloy consists of, in weight percent, 4.5 to 5.5% aluminum, 6 to 8% cobalt, 6.5 to 7.5% chromium, 0.1 to 0.6% hafnium, 2.5 to 3.5% molybdenum, 5.5 to 6.5% rhenium, 5.5 to 6.5% tantalum, 3.5 to 4.5% tungsten, the balance consisting of nickel and unavoidable impurities.

6. The superalloy as claimed in claim 3, wherein said superalloy consists of, in weight percent, 4.5 to 5.5% aluminum, 6 to 8% cobalt, 6.5 to 7.5% chromium, 0.1 to 0.6% hafnium, 2.5 to 3.5% molybdenum, 5.5 to 6.5% rhenium, 5.5 to 6.5% tantalum, 2.5 to 3.5% tungsten, the balance consisting of nickel and unavoidable impurities.

7. The superalloy as claimed in claim 3, wherein said superalloy consists of, in weight percent, 4.5 to 5.5% aluminum, 5 to 7% cobalt, 6.5 to 7.5% chromium, 0.1 to 0.6% hafnium, 2.5 to 3.5% molybdenum, 5.5 to 6.5% rhenium, 5.5 to 6.5% tantalum, 2.5 to 3.5% tungsten, the balance consisting of nickel and unavoidable impurities.

8. The superalloy as claimed in claim 3, wherein said superalloy consists of, in weight percent, 4.5 to 5.5% aluminum, 6 to 8% cobalt, 7.5 to 8.5% chromium, 0.1 to 0.6% hafnium, 2.5 to 3.5% molybdenum, 5.5 to 6.5% rhenium, 5.5 to 6.5% tantalum, 2.5 to 3.5% tungsten, the balance consisting of nickel and unavoidable impurities.

9. A nickel-based superalloy turbomachinery part as claimed in claim 1.

10. The part as claimed in claim 9, wherein said part comprises a thermal protective coating formed of a bonding layer deposited on the nickel-based superalloy, and a thermal barrier layer deposited on the bonding layer.

11. The part as claimed in claim 9, wherein said part is single-crystal.

12. The superalloy as claimed in claim 1, wherein the amount of molybdenum, in weight percent, is more than 2.5% and up to 4%.

13. The superalloy as claimed in claim 1, wherein the amount of molybdenum, in weight percent, is from 2.7 to 4%.

14. The superalloy as claimed in claim 1, wherein the amount of molybdenum, in weight percent, is from 3 to 4%.

15. A process for manufacturing a nickel-based superalloy turbomachinery part as claimed in claim 1 by casting.

16. The process as claimed in claim 15, wherein the process comprises depositing a thermal protective coating on the nickel-based superalloy part according to the following steps:

depositing a bonding layer on the part;

depositing a thermal barrier layer on the bonding layer.

* * * * *